Oct. 13, 1942.   P. F. SHIVERS   2,298,810
CONTROL SYSTEM
Filed June 6, 1938   3 Sheets-Sheet 1

Inventor
Paul F. Shivers
By George H. Fisher
Attorney

Oct. 13, 1942.   P. F. SHIVERS   2,298,810
CONTROL SYSTEM
Filed June 6, 1938   3 Sheets-Sheet 2
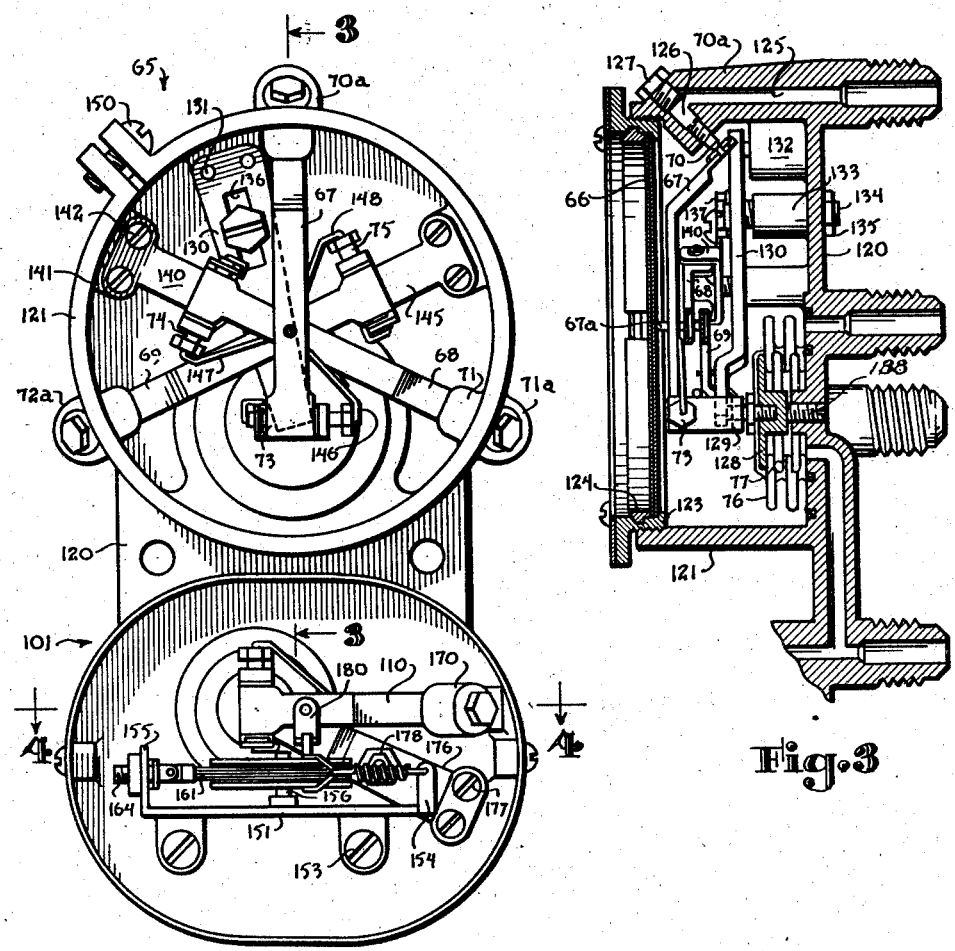
Fig.3
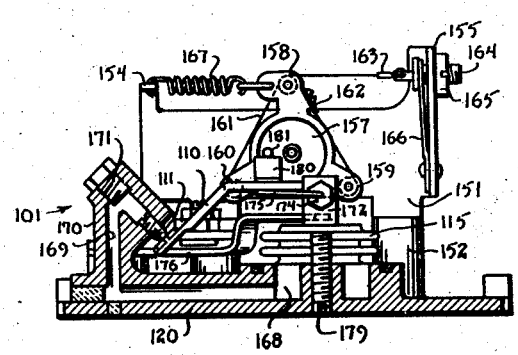
Fig.2
Fig.4
Inventor
Paul F. Shivers
George H Fisher
Attorney Oct. 13, 1942.  P. F. SHIVERS  2,298,810
CONTROL SYSTEM
Filed June 6, 1938  3 Sheets-Sheet 3

Inventor
Paul F. Shivers
By
George H Fisher
Attorney

Patented Oct. 13, 1942

2,298,810

UNITED STATES PATENT OFFICE 2,298,810

CONTROL SYSTEM

Paul F. Shivers, Wabash, Ind., assignor to Minneapolis-Honeywell Regulator Company, Minneapolis, Minn., a corporation of Delaware Application June 6, 1938, Serial No. 211,997

13 Claims. (Cl. 257—3)

This invention relates in general to air conditioning and is more particularly concerned with automatic controls for air conditioning systems.

It is an object of this invention to provide an automatic control system for automatically placing a cooling device in operation when cooling is required, for automatically placing an indirect heating device in operation when a slight amount of heat is required, and for placing a direct heating device in operation when a large amount of heat is required for maintaining the space comfortable.

A further object of this invention is to provide a system of this type in which the standard of temperature maintained during the cooling season is varied automatically for providing proper comfort conditions within the space.

A further object of this invention is the provision of a pneumatic control arrangement for adjusting the standard of the condition maintained by a pneumatic type of controller in accordance with a plurality of conditions.

Still another object of this invention is the provision of a pneumatic adjusting arrangement for a condition responsive device which is operable over a wide range of values.

Other objects of this invention lie in various structural details of the control apparatus and in various subcombinations of the complete system. These objects will become apparent from the following description and the appended claims.

For a full disclosure of my invention, reference is made to the following detailed description and to the accompanying drawings, in which:

Figure 2 is a front view with the covers removed of a combined space temperature and relative humidity controller;

Figure 3 is a section taken on line 3—3 of Figure 2;

Figure 4 is a section taken on line 4—4 of Figure 2;

Figure 1:
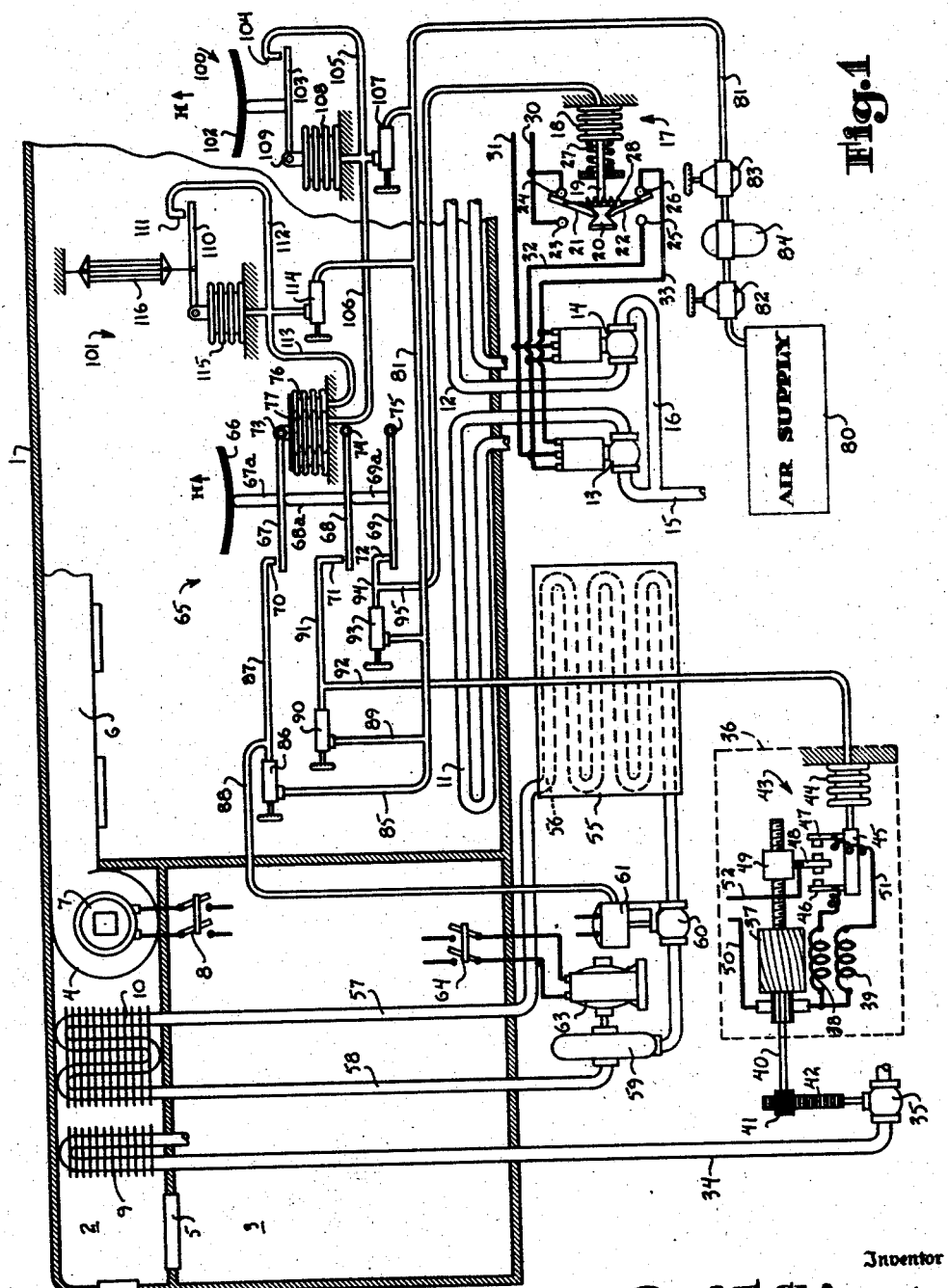
Figure 1 illustrates diagrammatically a complete control system embodying the novel features of my invention.

Referring to Figure 1, reference character 1 indicates diagrammatically a railroad car which is provided with an air conditioning chamber 2 located adjacent the ceiling of the vestibule 3. A fan 4 is located within the chamber 2 and acts to cause air to flow into the chamber 2 through an opening 5 and to flow through the chamber 2, this fan discharging into a duct 6 which distributes the conditioned air throughout the car. The fan 4 is driven by a motor 7 under the control of a manual switch 8. Located within the conditioning chamber 2 is a heating coil 9 for heating the air in the winter, and a cooling coil 10 for cooling the air during the summer.

The car 1 may also be provided with direct radiation for heating the car during severe weather. This direct radiation is shown as comprising coils 11 and 12 located adjacent the floor of the car, these coils being connected to two position type control valves 13 and 14, respectively. These valves, in turn, are connected by pipes 15 and 16 to a source of steam or other suitable heating medium. The valves 13 and 14 are controlled in unison by means of an air electric relay generally indicated as 17. This relay is diagrammatically illustrated as comprising a bellows 18 which actuates a shaft 19 carrying member 20 for actuating switch members 21 and 22 which cooperate with contacts 23, 24, 25, and 26. The bellows 18 is biased by means of a spring 27. Upon a decrease in pressure within bellows 18, the shaft 19 will move to the right while the switch members 21 and 22 will remain in engagement with contacts 24 and 26, respectively, due to the action of a spring 28. When bellows 18 contracts sufficiently to cause the switch members 21 and 22 to cross the center line of spring 28, this spring will cause snapping of members 21 and 22 into engagement with contacts 23 and 25. Upon an increase in pressure within bellows 18, the opposite action will take place, namely, the switch members 21 and 22 will snap into engagement with the contacts 24 and 26, as shown.

The contacts 23 and 24 are connected together and to a line wire 30, while the other line wire 31 is connected to the common terminals of the control valves 13 and 14, as shown. The contact 25 is connected by wire 32 to the opening terminals of valves 13 and 14, while contact 26 is connected by wire 33 to the closing terminals of these valves. When the pressure applied to the bellows 18 is above a predetermined value, the switch members 21 and 22 will assume the positions shown which completes a circuit from line wire 30, contact 24, switch members 21 and 22, contact 26, wire 33, to the closing terminals of valves 13 and 14. When the pressure in bellows 18 is below this predetermined value, the switch members 21 and 22 will engage the contacts 23 and 25 for completing a circuit through the opening terminals of valves 13 and 14. It should, therefore, be seen that when the pressure applied to bellows 18 is above a predetermined value, the valves 13 and 14 will be open, while when the pressure applied to bellows 18 is below such predetermined value, the valves 13 and 14 will be closed for placing the direct heaters 11 and 12 out of operation.

The heating coil 9 is connected by pipe 34 to a valve 35 which controls the flow of steam or other suitable heating medium to coil 9. This valve is preferably actuated by means of an air-electric motor 36. This air electric motor is diagrammatically illustrated as comprising a reversible direct current motor having an armature 37 and series fields 38 and 39. The armature 37 actuates an operating shaft 40 through a gear train (not shown) and the shaft 40, in turn, actuates the valve 35 by means of pinion 41 and rack 42. It will be understood that when the field coil 38 is energized the armature 37 will rotate in one direction, while when the field coil 39 is energized the armature 37 will rotate in the opposite direction.

Selective energization of the coils 38 and 39 is controlled by means of a relay 43. This relay consists of a bellows 44 which actuates an insulated contact carrier 45 which carries contacts 46 and 47 cooperating with a contact 48, this contact being carried by an insulated nut 49 threaded upon a portion of the operating shaft 40.

When the pressure within the bellows 44 is increased, the contact carrier 45 will be shifted to the left thus bringing contact 47 into engagement with contact 48. This will complete a circuit from wire 50 through armature 37, field coil 39, wire 51, contacts 47 and 48, to wire 52, which will cause rotation of the shaft 40 in a direction for closing valve 35. This rotation of shaft 40 will cause movement of nut 49 to the left, thus tending to disengage contact 48 from contact 47. When the closing movement of valve 35 corresponds to the expansion movement of bellows 44, contact 48 will become disengaged from contact 47 thereby deenergizing the motor and stopping the movement of the valve. This follow-up action provides for a fixed and definite valve position for each value of the pressure applied to the bellows 44. It will be apparent that upon decrease in pressure within bellows 44, the contact 46 will engage contact 48 for causing movement of the valve towards open position an amount proportionate to the decrease in pressure.

Reference character 55 indicates an ice bunker or other cooling device which may contain a coil 56, the outlet of which is connected by pipe 57 to the inlet of cooling coil 10 in the conditioning chamber 2. The outlet of cooling coil 10 is connected by a pipe 58 to the inlet of pump 59. This pump, in turn, is connected to a control valve 60 at the inlet of coil 56. The valve 60 may be actuated by means of an air-electric motor 61 which may be of the same type as the motor 36 for valve 35. However, the motor 61 is arranged reversely to that of motor 36 so as to cause the valve 60 to be opened upon increase in pressure applied to motor 61. The pump 59 may be driven by means of an electric motor 63 under the control of a manual switch 64.

The air-electric relay 17 and the air-electric motors 36 and 61 are controlled by means of a thermostat 65 which may be located at any desired point within the interior of the car. This thermostat is diagrammatically illustrated in Figure 1 as comprising a bimetallic element 66 which is adapted to actuate valve members 67, 68, and 69 which cooperate with bleed ports or nozzles 70, 71, and 72, respectively. The valve member 67 is pivoted to a movable support 73, while the valve members 68 and 69 are provided with stationary pivots 74 and 75. The movable support 73 preferably comprises a diaphragm structure consisting of an outer bellows 76 and an inner concentric bellows 77, this providing two separate chambers in said diaphragm structure which are out of communication with each other. The purpose of this diaphragm structure is to provide for adjusting the position of the valve member 67 relative to the bimetallic element 66 for varying the temperature maintained in the car during the cooling season.

Reference character 80 indicates a suitable source of air supply, to which an air supply main 81 is attached, reducing valves 82 and 83 and filter 84 being interposed in this main. Connected to the main 81 by means of pipe 85 is a restriction 86, the outlet of which is connected to port 70 and valve motor 61 by pipes 87 and 88. Also connected to the main 81 by pipe 89 is a restriction 90, and the outlet of this restriction is connected by pipes 91 and 92 to the port 71 and to the valve motor 36. Also connected to main 81 is a restriction 93, and the outlet of this restriction is connected by pipes 94 and 95 to the port 72 and air-electric relay 17. By this arrangement, the valve member 67 and port 70 control the pressure applied to valve motor 61, the valve member 68 and port 71 control the pressure applied to valve motor 36, and the valve member 69 and port 72 control the pressure applied to the relay 17.

The valve members 67, 68, and 69 are arranged relatively to their valve ports so as to provide sequential operation of the valve motors 61 and 36 and the relay 17. When the space temperature is at a low value, the bimetallic element 66 will through abutment members 67a, 68a, and 69a push valve members 67, 68 and 69 away from their respective ports. As the space temperature increases from this value, the center of the bimetallic element 66 will rise, this permitting upward movement of the valve members 67, 68, and 69 under the action of individual springs. Upon this rise in temperature, the valve member 69 will first engage port 72, while the valve members 67 and 68 remain spaced from their respective ports. Upon continued rise in temperature, the valve member 68 will cover port 71 while port 70 will remain uncovered by valve member 67, and upon continued rise in temperature, the valve member 67 will finally cover valve port 70.

Assuming now that the space temperature is at a high value, such as 80° F., the valve members 67, 68, and 69 will all cover their respective ports. Due to the closing of port 72 by valve member 69, maximum pressure will be built up within the bellows 18 and this will cause the relay 17 to assume the position shown which causes the valves 13 and 14 to be closed for placing heaters 11 and 12 out of operation. Due to closing of port 71 by valve members 68, maximum pressure will be applied to bellows 44 of the air-electric motor 36, this causing this motor to drive valve 35 to completely closed position. Also due to port 70 being closed by valve member 67, maximum pressure will be applied to valve motor 61 to open valve 60 wide thus providing a maximum amount of cooling for the space. It will therefore be seen when the space temperature is at this high value, the supply of heating medium to the heating coils 9, 11, and 12 will be cut off and the supply of cooling medium to the cooling coil 10 will be at a maximum. Upon decrease in space temperature, the valve member 67 will be shifted slightly away from port 70 thus increasing the rate of bleed from this port which decreases the pressure applied to valve motor 61. This will cause the valve motor 61 partially to close valve 60 for decreasing the supply of cooling fluid to the cooling coil 10. Upon still further fall in temperature, the valve member 67 will be shifted away from port 70 sufficiently for providing maximum bleed through port 70 which causes substantially atmospheric pressure to be applied to motor 61, thus causing this motor to shut the valve 60 completely. At this time, valve members 68 and 69 will remain in engagement with their respective ports 71 and 72 for maintaining the heating apparatus out of operation. It should therefore be seen that during the cooling season, the position of valve 60 will be graduatingly adjusted in a manner to maintain predetermined space temperatures while at this time the heating apparatus will be prevented from operating.

As the temperature within the car falls to a value at which heating is required, for instance 70° F., the valve member 68 will begin moving away from port 71 due to the action of bimetallic element 66. At this time, the valve member 67 is substantially spaced from port 70 and thus the cooling valve 60 is completely closed. Due to valve member 68 shifting away from port 71, air will bleed through port 71 thus reducing the pressure applied to bellows 44 of motor 36. This will cause motor 36 to open the valve 35 for supplying heating medium to the heating coil 9. At this time, the position of the valve 35 will be graduatingly controlled by valve member 68 for maintaining the space temperature substantially constant, the valve being opened as the space temperature decreases and being closed as the space temperature increases. Also at this time, the valve member 69 will remain engaged with port 72 for supplying maximum pressure to relay 71 which maintains valves 13 and 14 closed.

As the weather becomes more severe, the heating coil 9 will not be capable of maintaining the car sufficiently warm even when the valve 35 is wide open. This will result in the space temperature continuing to fall. When this space temperature falls to a predetermined minimum value, such as 68° F., the valve member 69 will disengage port 72 for reducing the pressure applied to the bellows 18 of relay 17. This reduction in pressure will cause contraction of bellows 18 for shifting switch members 21 and 22 into engagement with contacts 23 and 25, thereby opening valves 13 and 14 thus supplying heating medium to the direct heating coils 11 and 12.

From the description thus far, it should be apparent that when the space temperature is high enough to require cooling, the position of valve 61 will be adjusted for maintaining the desired space temperature. As the space temperature falls, the valve 61 will be closed and upon a fall in space temperature to a value requiring heating, the valve 35 will be opened while the valves 13 and 14 remain closed. If this is incapable of maintaining the desired space temperature, the valves 13 and 14 will finally be opened. It will be apparent that upon rise in temperature the various devices will operate in reverse order.

During the cooling season, it is desirable to raise the temperature maintained within the car as outside temperature increases in order to prevent the space from feeling too cool to the occupants at this time. It is also desirable to vary the space temperature in accordance with variations in space relative humidity for thereby compensating for the effect of relative humidity changes upon human comfort. In order to obtain these results, an outside temperature compensator 100 and an inside humidity compensator 101 are provided, these compensators being arranged to vary the pressure applied to the adjusting diaphragm structure of valve member 67. Referring to the outside temperature compensator 100, this device may consist of a bimetallic element 102 which actuates a valve member 103 cooperating with a port 104. This port 104 is connected by pipes 105 and 106 to the interior of bellows 77 and also to the restriction 107 which is connected to the air supply main 81. As the outside temperature increases, the bimetallic element 102 will permit valve member 103 to approach port 104 which will restrict the rate of bleed through this port and consequently increase the pressure applied to the interior of bellows 77. This will cause expansion of the bellows structure and upward movement of fulcrum 73, this having the effect of shifting valve member 67 away from port 70 for decreasing the amount of cooling performed. This will result in the space temperature increasing, and in response to this increase in space temperature the bimetallic element 66 will permit valve member 67 to approach port 70 for thereby increasing the amount of cooling fluid supplied to the cooling coil 10. When the resulting increase in cooling fluid supply is sufficient for preventing further temperature increase, the space temperature will remain constant at this higher value. It should, therefore, be seen that as outside temperature increases, the compensating thermostat 100 will adjust the thermostat 65 in a manner to cause a higher space temperature to be maintained.

In pneumatic controllers of the type employing a bleed port and valve member cooperating therewith, a very slight movement of the valve with respect to the port is sufficient to permit the bleeding to reach its maximum value. For instance, with this type of controller when the valve member is shifted only .001 inch from the port, the bleeding through the port will be at a maximum. Due to the extreme sensitivity of this type of pneumatic control, it is not suited for use in a compensating type of instrument wherein the range of the instrument must be very wide. In order to widen out the range of the instrument so as to be suitable for compensating purposes, a bellows 108 is provided for shifting the fulcrum 109 of the valve member 103. This bellows 108 is connected to the pipe 105 so that it is subjected to the pressure established by the valve member 103. Assuming that outside temperature increases, the valve member 103 will be shifted towards its port by the thermostatic element 102, this increasing the pressure applied to the bellows 77 and also the pressure applied to bellows 108. In response to this increase in pressure, the bellows 108 will expand thus raising the pivot 109 of valve member 103 which has the effect of causing it to recede from port 104. In other words, the bellows 108 opposes the action of the thermostatic element 102 and provides what may be termed a partial follow-up movement tending to return the valve member 103 to its original position with respect to port 104. Due to this action of bellows 108, a given downward movement of bimetallic element 102 will have less effect on the position of valve member 103 relative to valve port 104, than it would have if the bellows 108 were not present. The bellows 108 therefore acts to widen out the range of the thermostat 100 so that it is suitable for adjusting the thermostat 65 over a wide range of outdoor temperatures.

Referring to the humidity compensator 101, this instrument is shown diagrammatically in Figure 1 as comprising a valve member 110 cooperating with a port 111, this port being connected by pipes 112 and 113 to the space between bellows 76 and 77 of the adjusting diaphragm structure of thermostat 65. The pipes 112 and 113 are also connected to a restriction 114 which is connected to the air supply main 81. Valve member 110 is fulcrumed to a bellows 115 which has the same function as the bellows 108 of thermostat 100. This valve is also actuated by means of a humidity responsive device 116.

Assuming a decrease in relative humidity within the space, the humidity responsive device 116 will shrink, thus causing valve member 110 to approach port 111, this raising the pressure in the space between bellows 76 and 77 of the adjusting diaphragm structure. This will cause upward movement of the pivot 73 of valve member 67 thus causing valve member 67 to recede from port 70 for decreasing the pressure applied to valve motor 61 thus decreasing the amount of cooling fluid supplied to cooling coil 10. This decrease in cooling fluid supply will result in the space temperature rising and in response to this rise in space temperature, the thermostatic element 66 will cause valve member 67 to approach port 70 for increasing the supply of cooling medium. When the space temperature has risen to a point wherein the cooling fluid increase is sufficient for preventing further increase in temperature, the space temperature will remain constant at this higher value. It will, therefore, be seen that a decrease in relative humidity will adjust the thermostat 65 in a manner to maintain a higher space temperature. This adjustment of the space thermostat 65 in accordance with variations in humidity provides for maintaining a predetermined effective temperature within the space.

From the foregoing description, it will be apparent that the control system just described automatically controls the temperature within the space during both summer and winter. During the summer, the heating coils 9, 11 and 12 are automatically placed out of operation and the amount of cooling fluid supplied to the cooling coil 10 is controlled in order to maintain a predetermined effective temperature within the space, the standard of effective temperature maintained being varied in accordance with variations in outdoor temperature.

Referring now to Figures 2, 3, and 4, these figures indicate the details of construction of the space thermostat 65 and the humidity compensator 101. If desired, the thermostat 65 and compensator 101 may be mounted in a single casting or base 120. This casting 120 is formed to provide a circular casing 121 for housing the various parts of the thermostat. The casing 121 is open at its outer end and is threaded to receive a ring 123, into which ring the thermostatic element or disc 66 is held by means of a snap ring 124. Located about the periphery of the casing 121 are bosses 70a, 71a, and 72a, the boss 70a of which is shown in section in Figure 3. This boss contains an air passage 125 and is formed to provide a second passage 126 communicating with the passage 125 and which extends rearwardly, the valve port member 70 being located therein. A plug 127 is provided at the end of passage 126 for permitting access from the exterior of the instrument to the port member 70. It will be understood that bosses 71a and 72a are similar to boss 70a and provide air connections to the ports 71 and 72 (Figure 1). Located within the casing 121 is the diaphragm structure formed of bellows 76 and 77. Each of these bellows, it will be noted, is secured to the rear wall of casing 121 and also to a bellows head 128 which carries a U-shaped bracket 129. This bracket 129 carries the pivot 73 for the valve member 67 which extends from this pivot upwardly and rearwardly to the valve port 70. This valve member is provided with the abutment member 67a for engaging the thermostatic disc 66.

Reference character 130 indicates a spring member for biasing the bellows or diaphragm structure towards contracted position. This spring member is secured at its upper end by rivets 131 to a boss 132 and extends downwardly into the bracket member 129. In order to provide adjustment of the spring member 130, a collar 133 is secured to the base 120 by means of a bolt 134 and nut 135. This bolt 134 passes through a slot in the base member 120 which runs parallel with a slot 136 in the spring member 130. By loosening the nut 135, the collar 133 may be shifted parallel to the spring member 130. The collar 133 also receives an adjusting screw 137 which extends through the slot 136. By turning the adjusting screw 137, the tension of the spring may be adjusted as desired, and by shifting the collar 133 within its range of movement, the spring rate may be varied as desired for obtaining the desired movement of the diaphragm structure for a given change in pressure therein. In order to limit the degree of contraction of the bellows structure by spring 130, an adjustable stop screw 138 is provided which extends through the casting 120 into engagement with the bellows head 128.

Reference character 140 indicates a bracket member which is secured to a boss 141 in casing 121 by means of screws 142. This bracket member is formed to provide the pivot 74 for the valve member 68. This valve member is located behind the valve member 67 and extends across the center of casing 121 to its valve port 71. The valve member 69 is similarly arranged, its pivot being provided by the bracket member 145. Each of the valve members 67, 68, and 69 are provided at their respective pivots with springs 146, 147, and 148 for urging these valve members towards their respective ports.

The arrangement just described, it should be noted, provides for housing all three valve members compactly within a small space and further provides for sealing all of the working parts of the instrument in a closed chamber, thus preventing tampering with the instrument and also preventing dirt from reaching the various working parts. By turning the ring 123 which supports the bimetallic disc 66, the disc 66 may be moved inwardly or outwardly relative to the various valve members, thereby providing for an initial adjustment of the instrument. This ring may then be locked in place by tightening the lock screw 150. By removing the plugs 127, access may be had to the various valve ports and their positions may be varied by turning them with a screw-driver inserted through the access openings. This provides for adjustment of the operating sequence of the thermostat.

Referring to the humidity compensator 101, this device may comprise a bracket member 151 which is secured to the base member 120 by means of posts 152 and screws 153. This bracket member is provided with inwardly extending ears 154 and 155. Bracket member 151 also supports a stud 156 upon which is rotatably mounted a drum 157. This drum 157 is provided with rollers 158, 159, and 160 upon which is mounted a humidity responsive element consisting of a plurality of strands of hair 161, these strands being secured at one end to the drum 157 at 162, and being secured at their other ends to a clamping member 163 attached to an adjusting screw 164 located in the ear 155 of bracket member 151. This adjusting screw 164 is provided with a nut 165, rotation of which causes axial movement of the screw 164. A spring 166 is attached to the ear 155 and urges the adjusting screw 164 in a direction for retaining the nut 165 against the ear 155. A spring 167 is connected between the ear 154 and the drum 157 for urging rotation of the drum 157 in a counter-clockwise direction, this acting to maintain the strands 161 taut. With the arrangement just described, as the relative humidity increases, the strands 161 will increase in length and this will permit counter-clockwise rotation of the drum 157 by the spring 167. Upon a decrease in humidity, the strands 161 will shrink and this will cause rotation of drum 157 in the opposite direction against the action of spring 167.

The bellows 115 of this controller may be located in the base 120, this base being drilled out as at 168 for providing a passage placing the interior of the bellows 115 into communication with the passage 169 which leads through an extension 170 to the bleed port element 111. This extension 170 is provided with a plugged opening 171 for permitting access to the bleed port element 111.

The bellows 115 carries a U-shaped bracket member 172 which provides a pivot 174 for the valve member 110 which extends from this pivot to the port 111, a spring 175 being provided for urging this valve member against the valve port. The bellows 115 may also be provided with a spring member 176 which is secured to a suitable boss on base 120 by screws 177 and which extends into the bracket member 172. This spring 176 may be provided with an adjusting screw 178 for varying the spring tension. An adjusting screw 179 may also be provided in the base 120, this adjusting screw extending into the interior of bellows 115. This adjusting screw provides a stop for limiting the collapsing movement of the bellows 15.

The valve member 110 is provided with an extension 180 which cooperates with a pin 181 secured to the drum 157. This arrangement provides for movement of valve member 110 upon rotation of the drum 157. Thus when the relative humidity increases and drum 157 rotates in a counter-clockwise direction, the pin 181 will move downwardly (Figure 2) for shifting valve member 110 away from port 111. Upon a decrease in relative humidity the opposite action will take place.

Figure 5:
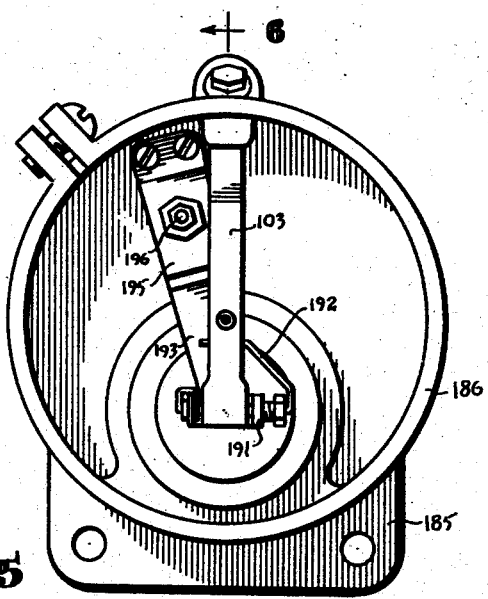
Figure 5 is an elevation of the outside compensator with its cover and disc type thermostatic element removed.
Figure 6:
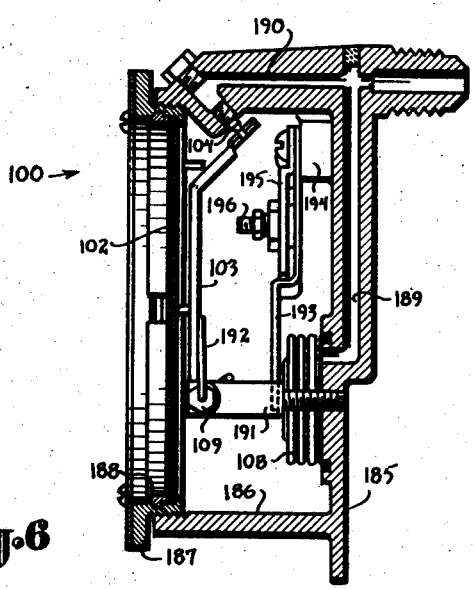
Figure 6 is a section taken on line 6—6 of Figure 5.

Referring now to Figures 5 and 6, these figures illustrate a preferred construction for the outside compensator 100. This outside compensator may include a base 185 which provides an open ended cylindrical chamber 186, the open end thereof having fitted thereinto a ring 187. This ring 187 carries the bimetallic element or disc 102, this disc being secured into the ring 187 by means of a snap ring 188. The bellows 108 of this instrument is secured to the base 185 and this base 185 is drilled out to provide an air passage 189 which communicates with a passage 190 leading to the bleed port member 104. The bellows 108 carries a U-shaped bracket 191 supporting the pivot 109 for the valve member 103. A spring 192 is provided for urging the valve member 103 towards the bleed port 104. The bellows 108 also is provided with a spring 193 which is secured to a boss 194. Also secured to the boss 194 is a bracket 195 which carries an adjusting screw 196 for adjusting the tension of spring 193.

From the foregoing description, it will be apparent that I have provided a control system and control instrumentalities for automatically maintaining the temperature within a conditioned space at proper values during the entire year. While I have shown and described my invention as applied to a railroad car air conditioning system, it will be understood that the invention is not limited to applications of this type but may be applied to other air conditioning applications. Inasmuch as many variations of my invention will occur to those skilled in the art, I desire to be limited only by the scope of the appended claims.

I claim as my invention:

1. In a compensated effective temperature control system, in combination, a space thermostat including a control member actuated by a thermostatic element, diaphragm means for adjusting said space thermostat in a manner to vary the standard of temperature maintained thereby, an outside temperature responsive compensating thermostat including a first valve device for varying the pressure applied to said diaphragm means, a humidity compensating device including a second valve device for varying the pressure applied to said diaphragm means, and differential widening means for the temperature and humidity compensating devices, comprising pressure responsive devices responsive to pressure applied to said diaphragm means tending to oppose movement of said valve devices.

2. In a compensated effective temperature control system, in combination, a space thermostat including a control member actuated by a thermostatic element, diaphragm means for adjusting said space thermostat in a manner to vary the standard of temperature maintained thereby, said diaphragm means including first and second diaphragm chambers out of communication with each other, an outside thermostat connected to said first chamber for varying the pressure in said first chamber in accordance with variations in outside temperature, and means influenced by the space relative humidity connected to said second diaphragm chamber for varying the pressure in said second chamber in accordance with variations in space relative humidity.

3. In a compensated effective temperature control system, in combination, a space thermostat including a control member actuated by a thermostatic element, diaphragm means for adjusting said space thermostat in a manner to vary the standard of temperature maintained thereby, said diaphragm means including first and second diaphragm chambers out of communication with each other, an outside thermostat including a valve device for varying the pressure applied to one of said chambers, differential widening means responsive to the pressure created by said valve device for adjusting said outside thermostat in a manner tending to oppose movement of said valve device, means influenced by space relative humidity and including a valve device for varying the pressure applied to said other chamber, and differential widening means responsive to the pressure created by said last mentioned valve device for adjusting said space relative humidity influenced means in a manner tending to oppose movement of said last mentioned valve device.

4. In a controller for a system of the class described, in combination, a casing providing a chamber, said casing being formed with an opening, a thermostatic element comprising a disc covering said opening, a plurality of valve ports in said chamber, a plurality of lever arms in said chamber, said lever arms being fulcrumed at spaced points and cooperating with said valve ports, means for actuating said lever arms in unison with movements of said thermostatic element, and a diaphragm structure associated with one of said lever arms for adjusting the fulcrum thereof.

5. In a controller for a system of the class described, in combination, a casing providing a chamber and formed with an opening, a thermostatic element comprising a disc covering said opening, a plurality of valve ports in said chamber, a plurality of lever arms in said chamber, said lever arms being fulcrumed at spaced points and cooperating with said valve ports, means for actuating said lever arms in unison with movements of said thermostatic element, a diaphragm structure associated with one of said lever arms for adjusting the fulcrum thereof, a spring for biasing said diaphragm structure, and means for adjusting the tension and rate of said spring.

6. In a controller for a system of the class described, in combination, a casing providing a chamber and formed with an opening, a thermostatic element comprising a disc covering said opening, a valve port in said chamber, a lever arm fulcrumed in said chamber and cooperating with said valve port, said lever arm being actuated in unison with movements of said thermostatic element, and a diaphragm structure associated with said lever arm for adjusting the fulcrum thereof.

7. In a controller for a system of the class described, in combination, a casing providing a chamber and formed with an opening, a thermostatic element comprising a disc covering said opening, a valve port in said chamber, a lever arm fulcrumed in said chamber and cooperating with said valve port, said lever arm being actuated in unison with movements of said thermostatic element, a diaphragm structure associated with said lever arm for adjusting the fulcrum thereof, a spring for biasing said diaphragm structure, and means for adjusting said spring.

8. In a control system for an air conditioning system having direct heating means, indirect heating means and cooling means, the combination of, first pressure actuated control means for controlling said cooling means, second pressure actuated control means for controlling said indirect heating means, third pressure actuated control means for controlling said direct heating means, a first valve device for controlling said first pressure actuated control means, a second valve device for controlling said second pressure actuated control means, a third valve device for controlling said third pressure actuated control means, a single thermostatic element for actuating all of said valve devices in sequence in a manner to place said cooling means out of operation, to place said indirect heating means into operation, and to place said direct heating means in operation upon fall in temperature, diaphragm means for adjusting said first valve device, said diaphragm means including two chambers out of communication with each other, means responsive to outside temperature for controlling the pressure applied to one of said chambers, and means influenced by space relative humidity for controlling the pressure applied to the other of said chambers.

9. In a control system for an air conditioning system having direct heating means, indirect heating means and cooling means, the combination of, first pressure actuated control means for controlling said cooling means, second pressure actuated control means for controlling said indirect heating means, third pressure actuated control means for controlling said direct heating means, a first valve device for controlling said first pressure actuated control means, a second valve device for controlling said second pressure actuated control means, a third valve device for controlling said third pressure actuated control means, a single thermostatic element for actuating all of said valve devices in sequence in a manner to place said cooling means out of operation, to place said indirect heating means into operation, and to place said direct heating means in operation upon fall in temperature, diaphragm means for adjusting said first valve device, and condition responsive means for varying the pressure applied to said diaphragm means to thereby vary the standard of temperature maintained in said space when said cooling means is in operation.

10. In a control system for an air conditioning system having direct heating means, indirect heating means and cooling means, the combination of, first pressure actuated control means for controlling said cooling means, second pressure actuated control means for controlling said indirect heating means, third pressure actuated control means for controlling said space heating means, a first valve device for controlling said first pressure actuated control means, a second valve device for controlling said second pressure actuated control means, a third valve device for controlling said third pressure actuated control means, and a single thermostatic element for actuating all of said valve devices in sequence in a manner to place said cooling means out of operation, to place said indirect heating means into operation, and to place said direct heating means in operation upon fall in temperature.

11. In a controller of the class described, in combination, a casing providing a chamber and formed with an opening, a thermostatic element comprising a disc covering said opening, valve means in said chamber including a valve port and a valve member, a lever arm for operating said valve means, said lever arm being actuated about a fulcrum in unison with movements of said thermostatic element, and differential widening means for said controller, said differential widening means comprising a diaphragm subjected to the pressure established by said valve means and acting upon the fulcrum of said valve lever in a manner tending to oppose rotation thereof by said thermostatic element.

12. In a controller of the class described, in combination, a casing providing a chamber and formed with an opening, a thermostatic element comprising a disc covering said opening, valve means in said chamber including a valve port and a valve member, a lever arm for operating said valve means, said lever arm being actuated about a fulcrum in unison with movements of said thermostatic element, differential widening means for said controller, said differential widening means comprising a diaphragm subjected to the pressure established by said valve means and acting upon the fulcrum of said valve lever in a manner tending to oppose rotation thereof by said thermostatic element, a spring for biasing said diaphragm, and means for adjusting said spring.

13. In a temperature control system of the class described, in combination, means for changing the heat content of a gas, a controller comprising a device responsive to a condition indicative of the heat content of said gas and a control member actuated thereby for controlling the heat content of said gas for controlling said heat content changing means, diaphragm means comprising a first chamber and a second chamber out of communication with each other for adjusting the control point of said controller, means including a valve device for varying the pressure in the first of said chambers, an element responsive to a condition affecting the heat content of the gas for actuating said valve device, differential widening means responsive to the pressure created by said valve device for attenuating movement of said valve device with respect to movement of said element, and means responsive to the load on the system for varying the pressure in the second of said chambers independently of the pressure existing in the first of said chambers.

PAUL F. SHIVERS.